3,051,550
FREE-FLOWING SODIUM SILICATE POWDER
David B. Speed, Euclid, Ohio, assignor to E. I. du Pont de Nemours and Company, Wilmington, Del., a corporation of Delaware
No Drawing. Filed Mar. 14, 1961, Ser. No. 95,464
3 Claims. (Cl. 23—110)

This invention relates to sodium silicate powder having improved free-flowing properties.

The problem of improving the free-flowing characteristics of sodium silicate powder is an old one. No completely satisfactory solution has been found prior to the present invention.

According to the present invention, sodium silicate powder is rendered substantially non-caking by admixture with the powder from 0.5 to 1.0% by weight of a specific and highly critical silico-aluminate compound defined as follows:

The silico-aluminate is an amorphous precipitated chemical compound having an $SiO_2$ content from 68 to 75 weight percent, an $Al_2O_3$ content from 8 to 12 weight percent, and an $Na_2O$ content from 4 to 9 weight percent. It is important that the silico-aluminate has an average particle diameter size in a range from 0.02 to 0.04 micron, with a maximum of 0.1% residue on passing a 325 mesh screen.

The compound can be further defined as having an ignition loss in the range from 7 to 11 and an oil absorption between 123 and 160 cubic centimeters per 100 grams, as measured by standard methods. Its specific gravity is 2.0–2.1.

The amorphous precipitated silico-aluminate material defined herein is a known material and is commercially available, for example, from the J. M. Huber Corporation of New York City, New York, under their trade name "Zeolex" 7A and "Zeolex" 23. The supplier advertises that the material has a bulk density that varies from 3 pounds per cubic foot for aerated commodity to 18–20 pounds per cubic foot for packed commodity.

The improved treated sodium silicate product of this invention can be made by simple mechanical blending to admix the sodium silicate particles and the silico-aluminate treating agent, in the proportions indicated above.

For some unexpected reason not fully understood at the present time, it appears that the quite high $SiO_2$ content and relatively low but important $Al_2O_3$ content cooperates in a critical way with the sodium silicate powder to give the beneficial results of this invention.

Comparative experimental tests bear out the marked superiority and unobvious advantages in free-flowing improvement of the sodium silicate powder. For example, in a laboratory test measuring the relative caking index of identical samples of sodium silicate powder treated with various treating agents, the treated products of the present invention were found to be more than three times better in anti-caking properties when compared with such representative known materials as Attasorb RVM, an aluminum-magnesium silicate product of the Mineral and Chemical Company, and "Hydrite" MP, a kaolinite (aluminum silicate) product of the Georgia Kaolin Company. A more than 300% improvement was observed when the treated products of this invention were compared with sodium silicate product treated in identical manner using "Hi Sil," a hydrated silica product of Columbia Southern Corporation. Marked superiority was also noted over "Bentonite" USP, an aluminum silicate product of the Fisher Company, where results of the present invention showed approximately 100% improvement using the silico-aluminate defined above according to the present invention. Relative caking index is defined as the force in grams to break the cake of the sample with agent divided by the corresponding force in grams for sample without agent, times 100.

The outstanding results of the present invention are also borne out by comparative tests with various commercially available anti-caking agents, such as calcium silicate, calcined magnesite, lignocellulose, and octadecanamide.

This invention will be better understood by reference to the following illustrative example.

*Example 1*

Sodium silicate powder having a screen size of 100% through 40 mesh is admixed by thorough stirring with 0.8% by weight of amorphous precipitated silico-aluminate compound identified hereinbefore and obtained as "Zeolex" 7A from J. M. Huber Corporation. The resulting product is free-flowing and lump free, even when stored under warm humid conditions for a period of several months.

The product of this example has a relative caking index of 35 whereas a representative aluminum-magnesium silicate anti-caking agent referred to above has a relative caking index of 97; an aluminum silicate (Kaolinite) referred to above has a relative caking index of 108; and a hydrated silica anti-caking agent commercially available and referred to above has a relative caking index of 180.

The above example can be repeated by substituting other amounts of the indicated ingredients for those set forth in the example in accordance with the teachings herein. Equally satisfactory results are obtained.

The invention claimed is:
1. The method of improving the free-flowing characteristics of sodium silicate powder comprising admixing therewith from 0.5 to 1.0% by weight of an amorphous precipitated silico-aluminate having a $SiO_2$ content from 68–75 weight percent, an $Al_2O_3$ content from 8–12 weight percent, an $Na_2O$ content from 4 to 9 weight percent, and an average particle diameter size in the range from 0.02 to 0.04 micron.
2. A novel composition comprising sodium silicate powder admixed intimately with from 0.5 to 1.0% by weight of an amorphous precipitated silico-aluminate having a $SiO_2$ content from 68–75 weight percent, an $Al_2O_3$ content from 8–12 weight percent, an $Na_2O$ content from 4 to 9 weight percent, and an average particle diameter size in the range from 0.02 to 0.04 micron.
3. The composition as set forth in claim 2 wherein said silico-aluminate has an ignition loss from 7 to 11 and an oil adsorption between 123 and 160 cubic centimeters per 100 grams.

References Cited in the file of this patent

UNITED STATES PATENTS

| | | |
|---|---|---|
| 1,139,741 | Vail et al. | May 18, 1915 |
| 2,082,936 | Baker | June 8, 1937 |
| 2,091,202 | Hallock et al. | Aug. 24, 1937 |

FOREIGN PATENTS

| | | |
|---|---|---|
| 390,751 | Great Britain | Apr. 13, 1933 |